(12) United States Patent
Russell et al.

(10) Patent No.: US 7,783,892 B2
(45) Date of Patent: *Aug. 24, 2010

(54) SYSTEM AND METHODS FOR ASSIGNATION AND USE OF MEDIA CONTENT SUBSCRIPTION SERVICE PRIVILEGES

(75) Inventors: David C. Russell, Virginia Beach, VA (US); Barry W. Johnson, Charlottesville, VA (US); Kristen R. Olvera, Charlottesville, VA (US)

(73) Assignee: Privaris, Inc., Charlottesville, VA (US)

( * ) Notice: Subject to any disclaimer, the term of this patent is extended or adjusted under 35 U.S.C. 154(b) by 1267 days.

This patent is subject to a terminal disclaimer.

(21) Appl. No.: 10/858,336

(22) Filed: Jun. 1, 2004

(65) Prior Publication Data

US 2005/0160042 A1    Jul. 21, 2005

Related U.S. Application Data

(60) Provisional application No. 60/474,750, filed on May 30, 2003.

(51) Int. Cl.
*G06F 21/00* (2006.01)

(52) U.S. Cl. ............. 713/186; 713/182; 713/194; 726/5; 726/6

(58) Field of Classification Search ............ 380/30, 380/200, 205, 210, 214, 221; 726/2, 26
See application file for complete search history.

(56) References Cited

U.S. PATENT DOCUMENTS

| | | |
|---|---|---|
| 4,005,428 A | 1/1977 | Graham |
| 4,847,542 A | 7/1989 | Clark |
| 4,993,068 A | 2/1991 | Piosenka et al. |
| 5,053,608 A | 10/1991 | Senanayake |
| 5,131,038 A | 7/1992 | Puhl et al. |
| 5,280,527 A | 1/1994 | Gullman et al. |
| 5,469,506 A | 11/1995 | Berson et al. |

(Continued)

FOREIGN PATENT DOCUMENTS

JP    2003-108473    4/2003

(Continued)

OTHER PUBLICATIONS

Supplementary European Search Report for EP 04 77 6620, mailed on Jan. 28, 2009; 3 pages.

(Continued)

*Primary Examiner*—Pramila Parthasarathy

(57) ABSTRACT

This invention describes a system and methods for media content subscription service distribution; typical services include cable television, premium content channels, pay-per-view, XM radio, and online mp3 services. Subscribers use portable electronic devices to store digital certificates certifying the subscriber's privileges and an assigned public key. The devices can communicate with specially enabled televisions, radios, computers, or other media presentation apparatuses. These, in turn, can communicate with central databases owned by the provider, for verification purposes. Methods of the invention describe media content subscription service privilege issuing and use. The invention additionally describes methods for protecting media content transmitted to users with a variety of encryption schemes. The invention also comprises methods for subscribed users to bestow a subset of their privileges to a number of secondary users, with appropriate permission from the media content subscription service provider.

27 Claims, 5 Drawing Sheets

U.S. PATENT DOCUMENTS

| | | | |
|---|---|---|---|
| 5,473,318 A | 12/1995 | Martel | |
| 5,475,835 A | 12/1995 | Hickey | |
| 5,481,265 A | 1/1996 | Russell | |
| 5,526,428 A | 6/1996 | Arnold | |
| 5,533,123 A | 7/1996 | Force et al. | |
| 5,591,949 A | 1/1997 | Bernstein | |
| 5,613,012 A * | 3/1997 | Hoffman et al. | 382/115 |
| 5,615,277 A | 3/1997 | Hoffman | |
| 5,715,403 A | 2/1998 | Stefik | |
| 5,721,583 A | 2/1998 | Harada | |
| 5,729,220 A | 3/1998 | Russell | |
| 5,805,719 A | 9/1998 | Pare, Jr. et al. | |
| 5,825,878 A | 10/1998 | Takahashi et al. | |
| 5,832,207 A | 11/1998 | Little et al. | |
| 5,838,812 A | 11/1998 | Pare, Jr. et al. | |
| 5,870,723 A | 2/1999 | Pare, Jr. et al. | |
| 5,894,550 A | 4/1999 | Thiriet | |
| 5,900,867 A | 5/1999 | Schindler | |
| 5,903,882 A * | 5/1999 | Asay et al. | 705/44 |
| 5,920,640 A | 7/1999 | Salatino et al. | |
| 5,952,641 A | 9/1999 | Korshun | |
| 5,991,408 A | 11/1999 | Pearson et al. | |
| 6,038,666 A | 3/2000 | Hsu et al. | |
| 6,041,410 A | 3/2000 | Hsu et al. | |
| 6,084,968 A | 7/2000 | Kennedy et al. | |
| 6,101,477 A | 8/2000 | Hohle et al. | |
| 6,119,096 A | 9/2000 | Mann et al. | |
| 6,135,646 A | 10/2000 | Kahn et al. | |
| 6,154,879 A | 11/2000 | Pare, Jr. et al. | |
| 6,167,517 A | 12/2000 | Gilchrist et al. | |
| 6,181,803 B1 | 1/2001 | Davis | |
| 6,182,221 B1 | 1/2001 | Hsu et al. | |
| 6,185,316 B1 | 2/2001 | Buffam | |
| 6,199,044 B1 | 3/2001 | Ackley et al. | |
| 6,199,099 B1 | 3/2001 | Gershman | |
| 6,201,484 B1 | 3/2001 | Russell | |
| 6,219,793 B1 | 4/2001 | Li et al. | |
| 6,256,393 B1 | 7/2001 | Safadi et al. | |
| 6,268,788 B1 | 7/2001 | Gray | |
| 6,282,649 B1 | 8/2001 | Lambert et al. | |
| 6,289,445 B2 | 9/2001 | Ekner | |
| 6,317,834 B1 | 11/2001 | Gennaro et al. | |
| 6,327,376 B1 | 12/2001 | Harkin | |
| 6,327,622 B1 | 12/2001 | Jindal et al. | |
| 6,330,770 B1 | 12/2001 | Fukunaga et al. | |
| 6,335,688 B1 | 1/2002 | Sweatte | |
| 6,353,889 B1 | 3/2002 | Hollingshead | |
| 6,356,905 B1 | 3/2002 | Gershman | |
| 6,366,682 B1 | 4/2002 | Hoffman et al. | |
| 6,367,017 B1 | 4/2002 | Gray | |
| 6,369,693 B1 | 4/2002 | Gibson | |
| 6,396,544 B1 | 5/2002 | Schindler | |
| 6,401,085 B1 | 6/2002 | Gershman | |
| 6,424,285 B1 | 7/2002 | Perdue | |
| 6,441,770 B2 | 8/2002 | Russell | |
| 6,449,367 B2 | 9/2002 | Van Wie et al. | |
| 6,466,781 B1 | 10/2002 | Bromba et al. | |
| 6,484,260 B1 | 11/2002 | Scott et al. | |
| 6,487,662 B1 | 11/2002 | Kharon et al. | |
| 6,490,680 B1 | 12/2002 | Scheidt et al. | |
| 6,499,099 B1 | 12/2002 | Cho | |
| 6,516,412 B2 | 2/2003 | Wasilewski | |
| 6,529,885 B1 | 3/2003 | Johnson | |
| 6,532,298 B1 | 3/2003 | Cambier et al. | |
| 6,535,871 B1 | 3/2003 | Romansky et al. | |
| 6,581,161 B1 | 6/2003 | Byford | |
| 6,609,198 B1 | 8/2003 | Wood et al. | |
| 6,615,264 B1 | 9/2003 | Stoltz et al. | |
| 6,618,806 B1 | 9/2003 | Brown et al. | |
| 6,636,973 B1 | 10/2003 | Novoa et al. | |
| 6,657,538 B1 | 12/2003 | Ritter | |
| 6,662,166 B2 | 12/2003 | Pare, Jr. et al. | |
| 6,668,332 B1 | 12/2003 | McNeil | |
| 6,671,808 B1 | 12/2003 | Abbott et al. | |
| 6,681,034 B1 | 1/2004 | Russo | |
| 6,719,200 B1 | 4/2004 | Wiebe | |
| 6,725,303 B1 * | 4/2004 | Hoguta et al. | 710/106 |
| 6,728,881 B1 | 4/2004 | Karamchetty | |
| 6,735,695 B1 | 5/2004 | Gopalakrishnan et al. | |
| 6,751,734 B1 | 6/2004 | Uchida | |
| 6,757,411 B2 | 6/2004 | Chau | |
| 6,765,470 B2 | 7/2004 | Shinzaki | |
| 6,766,040 B1 | 7/2004 | Catalano et al. | |
| 6,775,776 B1 | 8/2004 | Vogt et al. | |
| 6,786,397 B2 | 9/2004 | Silverbrook et al. | |
| 6,819,219 B1 | 11/2004 | Bolle et al. | |
| 6,832,317 B1 | 12/2004 | Strongin et al. | |
| 6,836,843 B2 | 12/2004 | Seroussi et al. | |
| 6,839,688 B2 | 1/2005 | Drummond et al. | |
| 6,844,660 B2 | 1/2005 | Scott | |
| 6,848,052 B2 | 1/2005 | Hamid et al. | |
| 6,850,147 B2 | 2/2005 | Prokoski et al. | |
| 6,850,252 B1 | 2/2005 | Hoffberg | |
| 6,853,739 B2 | 2/2005 | Kyle | |
| 6,857,073 B2 | 2/2005 | French et al. | |
| 6,862,443 B2 | 3/2005 | Witte | |
| 6,870,946 B1 | 3/2005 | Teng et al. | |
| 6,870,966 B1 | 3/2005 | Silverbrook et al. | |
| 6,871,193 B1 | 3/2005 | Campbell et al. | |
| 6,871,287 B1 | 3/2005 | Ellingson | |
| 6,871,784 B2 | 3/2005 | Jayaratne | |
| 6,876,757 B2 | 4/2005 | Yau et al. | |
| 6,877,097 B2 | 4/2005 | Hamid et al. | |
| 6,879,243 B1 | 4/2005 | Booth et al. | |
| 6,879,966 B1 | 4/2005 | Lapsley et al. | |
| 6,880,749 B1 | 4/2005 | Green et al. | |
| 6,880,750 B2 | 4/2005 | Pentel | |
| 6,883,709 B2 | 4/2005 | Joseph | |
| 6,886,096 B2 | 4/2005 | Appenzeller et al. | |
| 6,886,101 B2 | 4/2005 | Glazer et al. | |
| 6,886,104 B1 | 4/2005 | McClurg et al. | |
| 6,888,445 B2 | 5/2005 | Gotfried et al. | |
| 6,898,577 B1 | 5/2005 | Johnson | |
| 6,901,154 B2 | 5/2005 | Dunn | |
| 6,901,155 B2 | 5/2005 | Xia et al. | |
| 6,901,266 B2 | 5/2005 | Henderson | |
| 6,901,382 B1 | 5/2005 | Richards et al. | |
| 6,985,502 B2 | 1/2006 | Bunton | |
| 7,093,298 B2 * | 8/2006 | Rodriquez et al. | 726/28 |
| 7,272,721 B1 * | 9/2007 | Hellenthal | 713/182 |
| 7,302,634 B2 * | 11/2007 | Lucovsky et al. | 707/10 |
| 2001/0035814 A1 | 11/2001 | Uchida | |
| 2001/0051996 A1 | 12/2001 | Cooper et al. | |
| 2002/0010861 A1 | 1/2002 | Matsuyama et al. | |
| 2002/0124190 A1 * | 9/2002 | Siegel et al. | 713/202 |
| 2003/0037006 A1 | 2/2003 | Maruyama et al. | |
| 2003/0105725 A1 * | 6/2003 | Hoffman | 705/75 |
| 2004/0032400 A1 * | 2/2004 | Freeman et al. | 345/173 |
| 2005/0060232 A1 * | 3/2005 | Maggio | 705/14 |

FOREIGN PATENT DOCUMENTS

WO    PCTUS0042323      11/2000

OTHER PUBLICATIONS

International Search Report and Written Opinion for PCT/US04/17264, mailed on Mar. 25, 2005; 7 pages.
Office Action in European Patent Application No. 04 77 6220, mailed May 25, 2009; 4 pages.

Office Action in Canadian Patent Application No. 2,527,826, mailed May 29, 2009; 2 pages.

U.S. Appl. No. 60/395,361, to Johnson et al., filed Jul. 12, 2002; 38 pages.

Office Action in European Patent Application No. 04776220.8, mailed Dec. 2, 2009; 4 pages.

* cited by examiner

SYSTEM AND METHODS FOR ASSIGNATION AND USE OF MEDIA CONTENT SUBSCRIPTION SERVICE PRIVILEGES

RELATED U.S. APPLICATION DATA

This application claims priority under USC 119(e) of provisional patent application Ser. No. 60/474,750 filed May 30, 2003 entitled, "Secure Biometric Identification Devices and Systems for Various Applications," which is hereby incorporated by reference in its entirety.

BACKGROUND OF THE INVENTION

1. Field of the Invention

This invention relates generally to the field of media content subscription services, and more specifically to portable and remotely controlled user privileges, and electronic/digital resource and asset management.

2. Necessity of the Invention

Media content subscription services are increasingly popular and profitable services. Common antenna (CATV), or cable television, subscriptions are found in millions of homes across America, and music services such as www.emusic.com and XM Radio are reporting increases in user levels. Most media content subscription services require an individual to apply for subscription, and if the media content subscription service provider wishes to accept the individual, he/she is provided with an appropriate service privilege-receiver. In the case of CATV, an accepted individual typically receives a set-top-box that is uniquely identified and associated with the individual. The set-top-box is capable of decrypting the CATV signal and supplies the decrypted version to the individual's television.

However, once activated, these services typically require very little user identification, and an authorized user could unknowingly provide his benefits to other people. Most people have heard stories of 'stealing cable from the neighbors' and other rights-hijacking attempts. Additionally, because these services often expect use of a 'home base', such as a television set-top-box or a cookie on a computer, transporting subscription privileges from one location to another is anything from difficult to impossible. For example, it is very difficult for a cable subscriber to take his cable subscription service privileges to a friend's—and non-subscriber's—house for cable viewing at the friend's house.

The necessity for administrative convenience and security has overwhelmed the subscriber's flexibility of subscription permissions. There is a definite need for a user-centric subscription service system, allowing for vendor, provider and user security, while allowing for greater user flexibility.

3. Description of the Related Art

Digital Rights Management Related Art

U.S. Pat. No. 5,715,403 to Stefik discloses a system for controlling use and distribution of digital works. The invention allows the owner of a digital work to attach usage rights to their work. The usage rights define how the individual digital work may be used and distributed. Instances of usage rights are defined using a flexible and extensible usage rights grammar. Although the patent provides a network terminating device-based internal digital rights management system capability for managing and monitoring digital properties, the Stefik patent does not provide a user-oriented system for accessing digital rights and privileges.

U.S. Pat. Nos. 6,401,085, 6,356,905, and 6,199,099, all to Gershman, disclose a system that facilitates web-based information retrieval and display. A wireless phone or similar hand-held wireless device with internet protocol capability is combined with other peripherals to provide a portable portal into the Internet. The wireless device prompts a user to input information of interest to the user. This information is transmitted a query to a service routine running on a Web server. The service routine then queries the Web to find price, shipping and availability information from various Web suppliers. This information is available for use by various applications through an interface support framework. An "electronic valet" capability is also disclosed which represents a convenient mechanism for organizing user preferences, rights, privileges, etc. However, the patent, and the products it protects, does not provide a user-centric, media content subscription service system.

A variety of other U.S. Patents discuss securely or privately accessed systems, digital rights management systems, and other remotely, wirelessly, or portably accessed or controlled systems or resources, including U.S. Pat. Nos. 6,135,646, 6,256,393, 6,289,445, 6,327,622, 6,449,367, 6,499,099, 6,330,770, 6,535,871 and others. None of these patents provide a user-centric media content subscription service system.

U.S. Pat. No. 6,516,412 to Wasilewski discloses a CATV system that provides conditional access to services. The cable television system includes a head-end from which service "instances" are broadcast, and provides set-top units for receiving the instances and selectively decrypting the instances for display to system subscribers. These service instances are encrypted using public and/or private keys provided by service providers or central authorization agents. Keys used by the set-top units for selective decryption may also be public or private in nature, and such keys may be reassigned at different times to provide a cable television system in which piracy concerns are minimized. The Wasilewski patent appears not to perceive or articulate a need for portable, user-centric privileges. The Wasilewski patent is silent, vague, or incomplete on several features, including hierarchies of access privileges or verification of authenticated user privileges. There is also no mention of users porting their privileges between different remotely controlled devices and machinery.

Remote Control Related Art

U.S. Pat. No. 4,005,428 to Graham discloses a patent relating to private remote control communication systems. In Graham's patent, coded messages, e.g., for use in remote control of equipment, are transmitted and received in a system which purports to preclude unauthorized or accidental activation of a control associated with the receiving means. This presumed secure communication is accomplished by generating a plurality of carrier frequencies in a predetermined sequence and by modulating each carrier frequency in accordance with a digital code. The receiving means, which is primarily tuned to receive the first carrier in a transmission sequence, detects and decodes the received signals and stores the decoded message. The equipment to be controlled includes a receiver that is retuned to another carrier frequency after each bit of a coded message is detected, in a system that appears to resemble a "spread spectrum" type of a communications system, insofar as Graham's patent notes that the equipment is expected to be responsive to the entire received message.

The Graham patent appears to be one of many re-articulations of spread-spectrum communications systems, which can be fundamentally different, yet generically are well known in the art. Graham is primarily directed to communications by radio from a base transmitter to a radio-controlled station or to remote radio station equipment, where message privacy and security are important. Graham does not disclose media content subscription service applications.

U.S. Pat. No. 4,847,542 to Clark discloses an automatic garage door operator with remote load control. The apparatus of the invention is a remote control device comprising a two button portable controller that features a "secure mode." In accordance with the normal operation of the secure mode button, actuation when the garage door is closed toggles the remote controller between either a secure state or a non-secure state. In the secure state, the automatic garage door operator does not move the door upon receipt of a door signal. To open the door when in the secure state, the garage door operator must first press the secure button to enter the non-secure state and then press the door button to open the door. The secure button has a secondary function when the garage door is open and the secure state is prohibited. Actuation of the secure button when the door is open toggles the state of a load remote from the automatic garage door operator between an on state and an off state. This control is achieved via a signal modulated on the electric power main. Clark is limited to the control of garage doors and other doors, and does not anticipate or suggest applications outside of the narrow focus of the patent.

U.S. Pat. No. 5,473,318 to Martel discloses a car door operator that purports to provide enhanced security for controlled vehicle access by employing transmitters having unique identity codes that are fixed at the time of manufacture. A receiver includes a nonvolatile read/write identity code memory for storing the authorized identity codes. If a received identity code is found within this memory, then the user is authorized and the door is opened. Otherwise, the user is not authorized and entry is refused. A remotely disposed memory controller controls the authorized identity codes stored in the identity code memory, which is preferably electrically erasable programmable read only memory (EEPROM). The memory controller is preferably a desktop computer including a data base program with the identity of authorized users. The identity code of a transmitter held by a formerly authorized user can be determined via the data base program and deleted from the identity code memory without requiring return of the transmitter. "Pass back" is restricted by preventing additional door accesses for a predetermined time following each access. In an alternative embodiment, a two-button transmitter includes a fixed identity code and a user selectable identity code. One button transmits the selectable identity code to individualized receiver/operators also having a user settable identity code.

U.S. Pat. No. 5,721,583 to Harada, discloses an interactive television system for providing TV and CATV-based entertainment services and other TV-based services to authorized users, apparently primarily focused on electronic polling of users. The invention is based on a "central site" apparatus, apparently a high-capacity computer. Terminal devices bi-directionally communicate with the central computer via a digitally linked two-way CATV network, to provide video and audio inputs to a display apparatus thereto, with each of the terminal apparatuses being wirelessly controllable by one or more remote control apparatuses. Additionally, using remote controllers, users can request services or participate in TV-centric polling, with the TV being the communications medium in conjunction with a digital link to a central site, via a television-attached terminal, such as a set-top box. Message data issued by a remote control apparatus is automatically accompanied by apparatus identifier information, then read out from a memory of the remote control apparatus for identifying that remote control apparatus, and may also be accompanied by personal information concerning a registered user of the remote control apparatus. Onboard user recognition can be implemented by a plug-in IC card interface section or fingerprint recognition section, for enabling restriction of each remote control apparatus to use by only a specific registered user, or to enable only a specific registered user to access certain services.

Harada's patent does not lend itself to user-centric applications. In the Harada product, primary and apparent last resort placement of application intelligence appears centralized. Harada's "terminal" is apparently a set-top controller connected into the TV. However, set-top terminals appear effectively slaved to the central computer. They do not appear to recognize classes of devices allowed to access them. Implicitly, Harada's central computer is managing and authorizing the enabling of his terminal and by extension, the central site is effectively, (indirectly) managing remote control devices communicating with the terminal attached to the TV, all of which are controlled by and digitally linked to the central site.

The Harada patent does not disclose hierarchies of remote control devices or user privileges, optional identity credential verification subsystem flexibility, and pre-definable security options on a mobile, portable, application-by-application basis. There is also no mention of authorized users porting their remote controllers and their associated privileges between different remotely controlled devices and machinery.

U.S. Pat. No. 5,900,867 and U.S. Pat. No. 6,396,544, both to Schindler, et al, teach a self-identifying remote control device having a television receiver for use in a computer. An entertainment system is disclosed which has a personal computer as the heart of the system with a large screen VGA quality monitor as the display of choice. The entertainment system has digital satellite broadcast reception, decompression and display capability with multiple radio frequency remote control devices that transmit self-identifying signals and that have power adjustment capabilities. These features are used to provide context-sensitive groups of keys that are defined to affect only selected applications running in a windowing environment. The remote control devices of this invention claim to combine television and VCR controls with standard PC computer keyboard controls. A user of the Schindler invention is not subject to strict authentication and different levels of privilege to operate the remote control or the remote-controlled resource. Schindler is utilitarian for its stated applications and does not completely disclose or suggest use for one or more authorized users of the remote controller.

U.S. Pat. No. 6,369,693 to Gibson teaches a method of, and system for, transferring secure data. The method of transferring secure data in a remote control system includes a remote controller and a controlled apparatus that is operable in response to commands relayed by the remote controller. The controlled apparatus has a receiver for receiving transmissions from the remote controller. The remote controller has a transmitter, a memory for storing secure data and commands and a keypad. The embedded transmitter is controlled so that in response to a user wishing to transfer secure data to the user apparatus, it transmits this data at a power level lower than that which is normally used for sending other commands. The link between the remote controller user apparatus can be radio frequency wireless or infrared wireless.

U.S. Pat. No. 6,424,285 to Perdue, et al, discloses a communications system for transmitting and receiving remote control messages in an electronic remote control system. This communications system uses a message protocol that is purportedly suited for transmitting RF remote control messages with IR remote control messages in a time multiplexed fashion, wherein the RF remote control messages are transmitted during the pause intervals between IR remote control message transmission intervals. A plurality of data fields begins with a data field for specifying a destination device address. A security code data field allows a specific remote control transmitter to control a specific destination device. A status field specifies codes associated with the message. A keycode field carries a message payload. A checksum field verifies the transmission integrity of the remote control message. A remote control message based on the present message protocol may be expanded to include additional data fields and to expand pre-existing data fields. While the Purdue patent, and products it protects, appears utilitarian for applications requiring both RF and infrared data communications, there is no mention of using the remote controller apparatus for media content subscription services.

Russell, in U.S. Pat. Nos. 5,481,265, 5,729,220, 6,201,484, and 6,441,770 describes a 'secure access transceiver.' The invention illustrates a hand-held electronic device that incorporates wireless technology with a button-oriented user interface. The device is used to provide both identification of an individual and a device to a receiving device or system.

International Application No. PCT/US00/42323 describes a Biometric Personal Identification Device (BPID). A BPID is a hand-held electronic device that provides multi-factor authentication and allows its enrolled operator to control the release and dissemination of stored information such as financial accounts, medical records, passwords, personal identification numbers, and other sensitive data and information. The device has tamper-resistant packaging with form factors ranging from credit card size to key fobs. Various embodiments also include a biometric scanner, a liquid crystal display (LCD) and buttons for user interaction, and a wireless interface for communication with other electronic devices. The device has been developed so that the fingerprint cannot be physically or electronically removed or transmitted from the device, and information cannot be physically or electronically removed or transmitted from the device unless released by the operator of the authorizing biometric. All data and processing is performed securely. The BPID can store a variety of data and applications, though it is primarily intended for point-of-sale or other financial transactions. However, the BPID does not describe means for secure remote control access.

BRIEF SUMMARY OF THE INVENTION

This invention describes a system and methods for media content subscription service distribution; typical services include CATV, premium content channels, pay-per-view, XM radio, and online music services. Subscribers use portable electronic devices, such as a handheld computer or a laptop, to store digital certificates certifying the subscriber's privileges and an assigned public key. These certificates are issued and signed by the media content subscription service provider. The devices can communicate with specially enabled televisions, radios, computers, or other media presentation apparatuses. These, in turn, can communicate with central databases owned by the provider, for verification purposes. In some embodiments of the invention the media presentation apparatus can examine the privilege certificate; in other embodiments the media presentation apparatus forwards the privilege certificate to the central database for verification.

Methods of the invention describe media content subscription service privilege issuing and use. The invention additionally describes methods for protecting media content transmitted to users with a variety of encryption schemes. The invention also comprises methods for subscribed users to bestow a subset of their privileges to a number of secondary users, with appropriate permission from the media content subscription service provider. The system is designed for portability and security of issued privileges.

BRIEF DESCRIPTION OF DRAWINGS

Master Reference Numeral List

DETAILED DESCRIPTION OF THE INVENTION

This invention describes a system for accessing portable media content subscription service privileges, and/or other privileged or protected content or resources. Media content subscription services include CATV, premium content cable channels such as Home Box Office® (HBO®) and Showtime®, pay-per-view, online music services such as www.e-music.com, and satelite radio services such as XM and Sirius radio. These services are increasingly popular, but do not typically allow for portability or distribution of services to other qualified users. The invention described herein addresses both of these issues.

A Portable Media Content Subscription Service System

Figure 1:
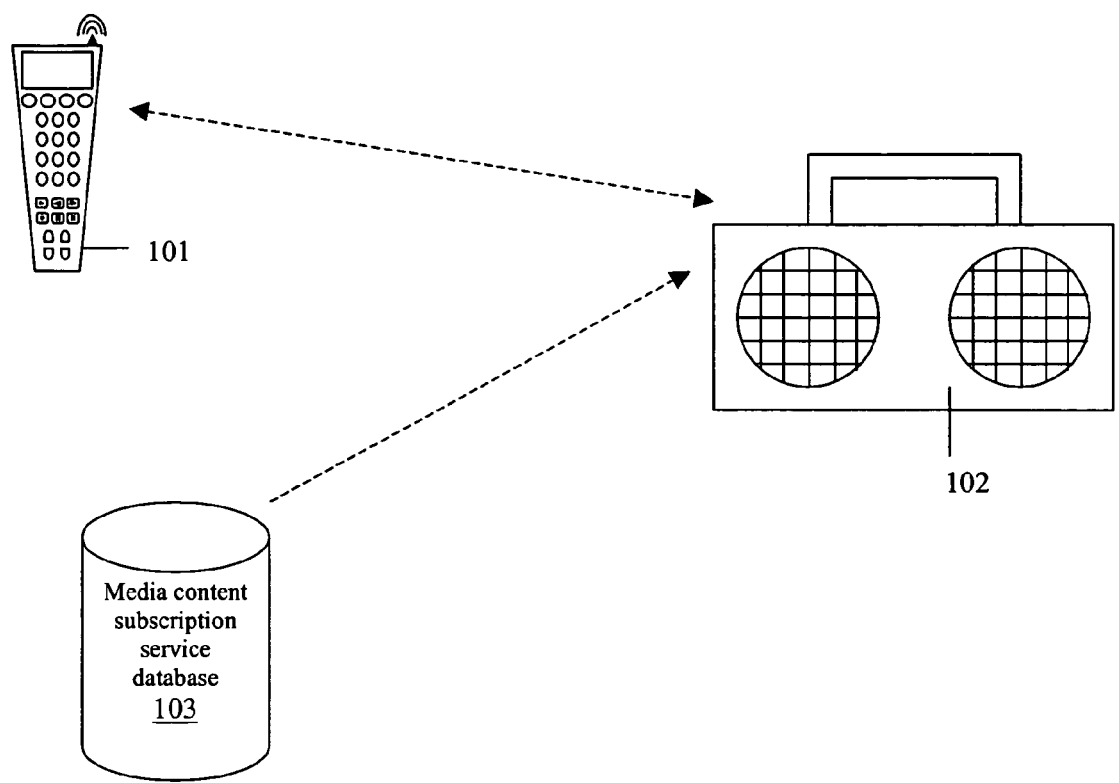
FIG. 1: System
101 Personal identification device
102 Media presentation apparatus
103 Media content subscription service database

The system of this invention can be seen in FIG. 1, and comprises at least one personal identification device 101, a media presentation apparatus 102, and a media content subscription service database 103. The personal identification device 101 is a portable device that is capable of identifying its user and providing proof of this identification, and that is also capable of encryption, decryption, and digital signature generation. For example, the personal identification device 101 may be a handheld personal digital assistant, such as Hewlett-Packard's iPAQ or Palm's Palm Pilot, the biometric personal identification device described in Russell, Johnson, Petka, and Singer, a laptop computer, or any other comparable device.

The media content subscription service provider establishes the level of identification required by the device. User identification is required in order to allow user access to a cryptographic key pair. Digital signatures generated by this key pair are considered binding to the individual, so the level of authentication and identification should be adjusted accordingly. Devices that incorporate local biometric authentication are preferable, given their ability to uniquely identify users. However, some services may only require a password, or a PIN. Other systems may wish to use the personal identification device 101 in conjunction with a smart card or a magnetic stripe card.

A media presentation apparatus 102 is a unit that is capable of presenting media content to a user that is adapted for communicating with a personal identification device 101 and possibly a remote database 103. This may be a television, computer, radio, stereo, or other comparable device. In preferred embodiments, the media presentation apparatus 102 is also capable of performing encryption, decryption, and verification of digital signatures. This may require addition of a "set-top-box," or other peripheral, capable of performing these cryptographic processes.

The media content subscription service database 103 is used to associate users with assigned cryptographic keys, and required billing information. The distribution of cryptographic keys is described in further detail below.

Applying for and Assigning Media Content Subscription Service Privileges

Figure 2:
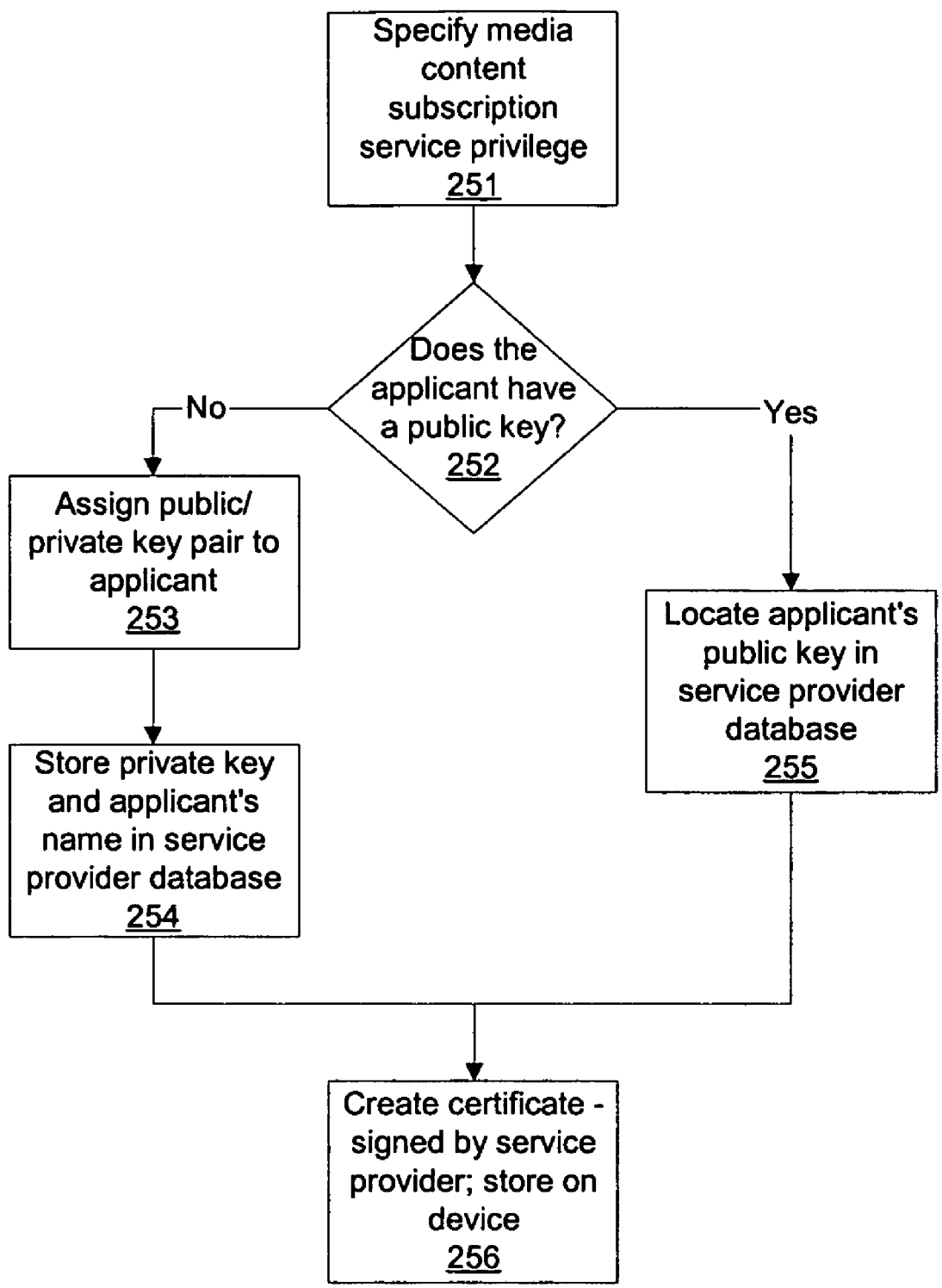
FIG. 2: Assigning Primary Applicant Privileges
251 Specify media content subscription service privilege
252 Determine if the primary applicant possesses a public/private key pair
253 Assign a public/private key pair to the primary applicant
254 Store the public key and the primary applicant's name in a database
255 Find the primary applicant's public key in a database
256 Create and store a media content subscription service privilege certificate

Individuals must apply to media content subscription service providers for privileges (this individual is referred to as the 'primary applicant'). The application and distribution of privileges can be seen in FIG. 2, steps 251-256. For example, individuals wishing to watch HBO must request the privilege from their CATV distributor for the premium content channel (step 251). If the distributor decides to authorize the service, the distributor searches its database—the media content subscription service database 103—for the applicant's unique identifier (step 252). For ease of discussion the unique identifier will be the applicant's name, but this selection has no impact on the scope of the invention.

If the primary applicant's name is in the database, the distributor accesses an associated public key (step 255). If not, the distributor assigns a unique and unused public/private key pair to the applicant and stores the public key in the distributor's database with the applicant's name (step 253). The distributor now creates a primary media content subscription service privilege certificate for the applicant, including the HBO privilege, the public key (either the stored key or the newly generated key), and a digital signature signed by the distributor (step 254). The certificate may also store a secret, shared symmetric key that can be used by the applicant's television to decrypt the HBO feed. This key will be described in further detail below.

The primary media content subscription service privilege certificate is downloaded to the primary applicant's personal identification device 101 upon completion (step 256). The individual can now present the certificate to access HBO at any location with a television and a cable connection. The individual may also bestow a subset of his privileges to a secondary applicant. This process is also described in further detail below.

Although this example describes the use of HBO premium content, this process can be used for subscription to online video or music streams, or any of the other media content subscription services described above or known in the art.

Primary User Use of Media Content Subscription Service Privileges

A user authentication process is performed in a manner supportive of the individual's right to privacy, in accord with the application accessed and the stipulations of the remote-controlled resource or application owner, if any. In one embodiment, a tamper-resistant memory within the remote control apparatus stores a pre-enrolled biometric template of the authorized individual. The template is never authorized to leave the device, and is "zeroed-out" upon unauthorized attempted physical or logical access. When an individual wishes to access controlled resources, he/she submits another biometric template through a reader on the device. If the submitted identity credential matches the template stored therein, the user is granted access to operate the remote controller and the machinery it controls.

In one embodiment, the remote controlled apparatus includes is a transmitter adapted for generating and transmitting a basic, "standalone," simplex, one-way "identity credential verification signal" transmission from a user's remote controlled device to a target device after successful initial user authentication. In this embodiment, the remote control apparatus performs the user authentication process, displays the results in the form of a user "identity credential verification display," generates and transmits as appropriate, a user "identity credential verification signal" and also transmits user control signals to the remotely controlled device.

Figure 3:
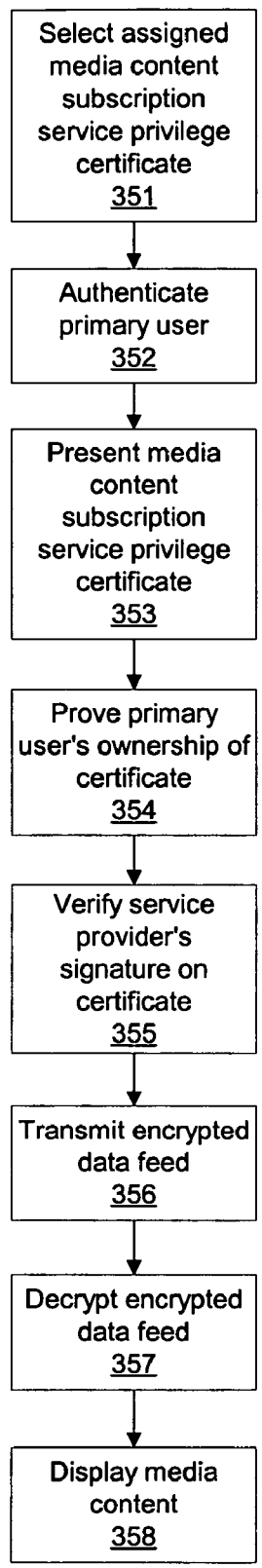
FIG. 3: Using Primary User Privileges
351 Select a media content subscription service privilege certificate
352 Authenticate the primary user
353 Present the media content subscription service privilege certificate
354 Prove ownership of the certificate
355 Verify the media content subscription service provider's digital signature
356 Transmit the encrypted media content feed
357 Decrypt the encrypted media content feed
358 Display the decrypted media content feed

Upon receipt of media content subscription service privileges, an individual may use the personal identification device 101 to use the privileges. This discussion uses the previous example, in which a primary applicant (now, the 'primary user') receives HBO privileges, and can be seen in FIG. 3, steps 351-358; again, however, this description can be expanded to cover any of the discussed services. In this example, the primary user wishes to watch a movie showing on HBO with a friend, at the friend's house. He arrives at his friend's house and selects the HBO privilege on his personal identification device (step 351). The device prompts the individual to authenticate himself (step 352), and upon authentication presents the primary media content subscription service privilege certificate to the television (step 353).

In one embodiment of the invention, the television forwards the certificate to the cable distributor. Note that the television must be enabled to send and receive messages, as well as perform encryption and decryption, as described above. This may necessitate a peripheral device that can be attached to the television to perform this task, such as a special set-top-box, or a "futurized" television that incorporates the capability. For purposes of further discussion, the television is assumed to have this capability. The cable distributor sends back a response to the personal identification device via the television, prompting the primary user to prove ownership of the private key corresponding to the public key in the certificate (step 354). This is typically accomplished by sending a string to the personal identification device, encrypting the string with the private key, transmitting the encrypted data back to the distributor, decrypting the message with the public key, and verifying that the decrypted message matches the original string. The cable distributor now verifies that it signed the certificate (step 355). If the cable distributor has already assigned a symmetric private key in the individual's certificate, it uses this key to encrypt the HBO feed, and transmits the encrypted feed to the television (step 356). The television saves the symmetric key and uses it to decrypt the feed (step 357), and presents HBO to the individual (step 358).

In a second embodiment of the invention, the television has been pre-programmed with the public key of the cable distributor. After receiving the primary media content subscription service privilege certificate, the television challenges the personal identification device to ensure that it has ownership of the private key (step 354), and is able to verify that the cable distributor signed the certificate without further communication with the distributor (step 355). Again, if the distributor has already included a symmetric key in the certificate, the television can use it to decrypt the HBO feed (step 357).

Depending on the embodiment of the invention and the nature of the media content subscription service provider, the provider may choose to use to issue the symmetric secret key in one of several ways. In a first method, the cable distributor may wish to use the same symmetric key for all authorized users of a service, and issue this as part of the primary media content subscription service privilege certificate. In a similar method, the cable distributor may wish to use the same symmetric key for all authorized users, but update the symmetric key on a daily, weekly, monthly, random, or other time interval basis. This could be used to make it more difficult for non-subscribers to access the secret symmetric key. Alternatively, each individual may be assigned a unique symmetric secure key. This may be stored in the primary media content subscription service privilege certificate or may be changed and provided each time the individual attempts to access the privilege.

Assigning Media Content Subscription Service Privileges to a Secondary Applicant A recipient of media content subscription service privileges may wish to allow other persons to use his privileges. For example, a father who has initially applied for and received privileges for HBO (the primary user) may wish to allow his teenage son (the secondary user) to subsequently watch the channel in his absence. The father may want to restrict the son's access to movies airing on HBO with a certain MPAA rating, or may wish to restrict the son's access to HBO at certain times. However, it may be necessary to impose a limit on the number of allowable secondary users per primary media content subscription service privilege certificate—for example, a cable distributor probably does not want a primary user to bestow his rights upon an entire neighborhood. Accordingly, the media content subscription service provider may establish a governing system that states a primary user can only issue a certain number of secondary certificates. This is left to the discretion of the media content subscription service provider.

Figure 4:
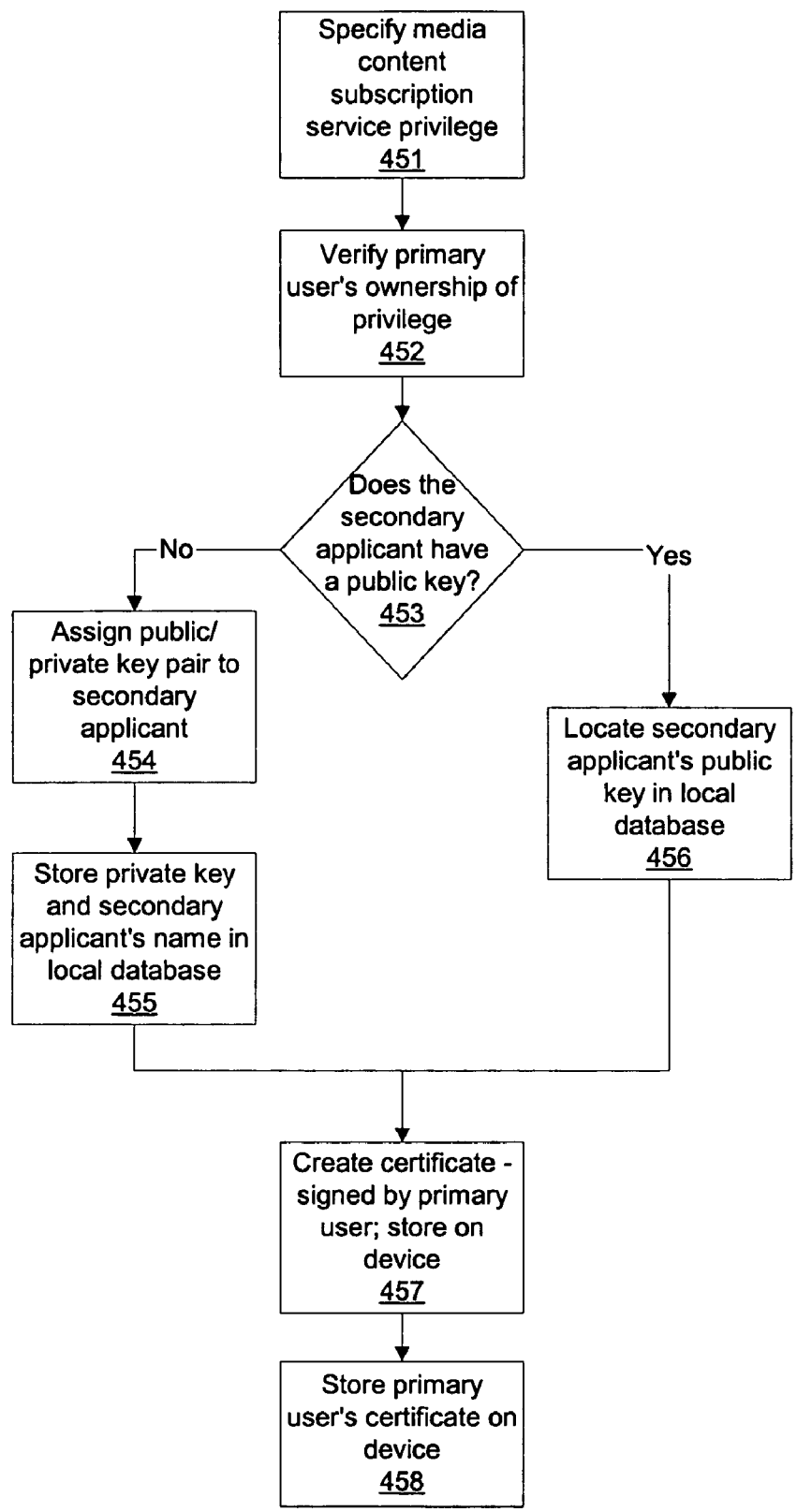
FIG. 4: Assigning Secondary Applicant Privileges
451 Specify media content subscription service privilege
452 Verify primary user possesses media content subscription service privilege
453 Determine if the secondary applicant possesses a public/private key pair
454 Assign a public/private key pair to the secondary applicant
455 Store the public key and the secondary applicant's name in a database
456 Find the secondary applicant's public key in a database
457 Create a media content subscription service privilege certificate for the secondary applicant
458 Store the secondary applicant's and the primary applicant's media content subscription service privilege certificate

The distribution process can be seen in FIG. 4, steps 451-458. The father instructs his personal identification device to create a secondary media content subscription service privilege certificate for his son, who is now the 'secondary user', and to incorporate any additional restrictions that he has selected, such as the MPAA ratings. This step determines the rights appropriate for the son (step 451). The device verifies that the father is only assigning a subset of his privileges to the son (step 452). The father now needs a public key for the son (step 453). If the father has issued a certificate to the son before, he may already have a public key for the son on file in his personal identification device or other storage location that he can retrieve and use accordingly (step 456). If not, a public/private key pair is created for the son and the father stores the public key in a local database (step 454). This database may reside anywhere that the primary user wishes to keep it.

The father then creates and signs the secondary certificate using his (the father's) private key, and provides it to the son (step 457). He also provides the primary media content subscription service privilege certificate to the son (step 458). These certificates may be stored in the son's personal identification device, or may be stored as part of the son's user account in the father's personal identification device.

Secondary User Use of Media Content Subscription Service Privileges

Figure 5:
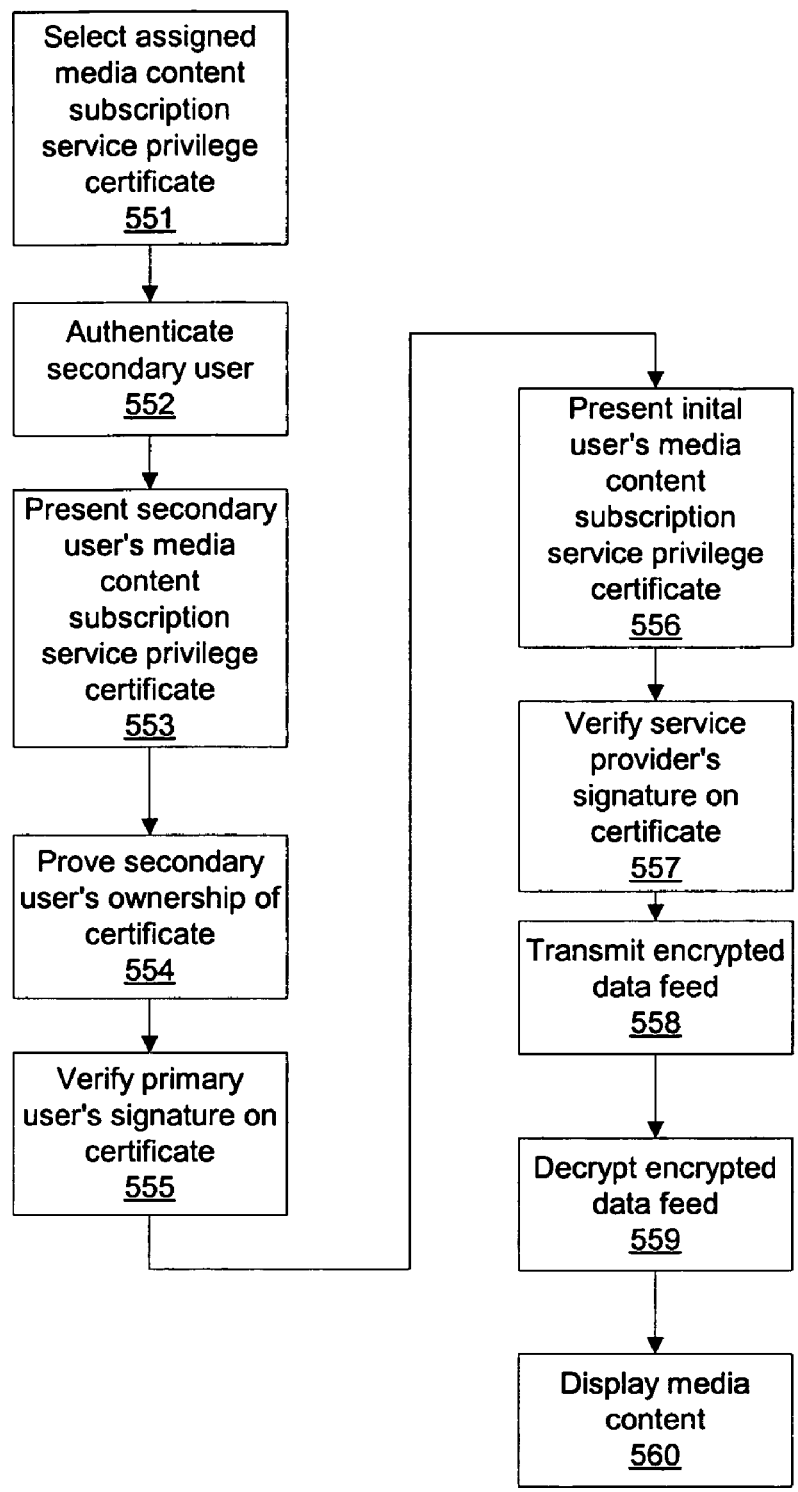
FIG. 5: Using Secondary User Privileges
551 Select a media content subscription service privilege certificate
552 Authenticate the secondary user
553 Present the secondary user's media content subscription service privilege certificate
554 Prove ownership of the certificate
555 Verify the primary user's digital signature
556 Present the primary user's media content subscription service privilege certificate 557 Verify the media content subscription service provider's digital signature
558 Transmit the encrypted media content feed
559 Decrypt the encrypted media content feed
560 Display the decrypted media content feed

In the example described above, a father elects to bestow his HBO privileges on his son. Once the son has received his secondary certificate he is free to make use of the privileges as stipulated by his father. This process is seen in FIG. 5, steps 551-560. If the son wishes to watch HBO, he selects the secondary certificate on his personal authentication device (step 551). He is prompted to authenticate, in order to prove that he is authorized to use the certificate (step 552). The son then presents the secondary certificate; depending on implementation of the system, the son's personal identification device may perform analysis of this certificate (step 553). Alternatively, the secondary certificate could be transmitted to the television or even to the cable provider as described above. The son proves ownership of the private key corresponding to the public key in his certificate (step 554), and the recipient verifies the digital signature signed by the primary user, the father (step 555).

The son then presents the primary certificate (issued to his father) (step 556), and the recipient verifies that the cable provider signed the certificate (step 557). The two certificates together demonstrate the son's ability to use the HBO service; without both, the son cannot access the channel. As described in the system above, the cable provider distributes a symmetric key that is used to encrypt and decrypt the HBO feed. This key is provided in the same manner as for the primary user.

The distributor sends the encrypted HBO feed to the son's television (step 558), and the feed is decrypted and displayed (step 559 and 560).

While the description above refers to particular embodiments of the present invention, it will be understood that many modifications may be made without departing from the spirit thereof. The accompanying claims are intended to cover such modifications as would fall within the true scope and spirit of the present invention.

We claim:

1. A method, comprising:
    authenticating, at a first personal identification device, a first biometric input of a first user based on a biometric template of the first user stored at the first personal identification device;
    sending a subscription privilege associated with the first user from the first personal identification device of the first user to a first media device at a first location when the first biometric input is authentic such that the first media device ceases to inhibit output of media transmitted from a media provider based on the subscription privilege associated with the first user, the subscription privilege associated with the first user being configured to permit access to the media from the media provider associated with the subscription privilege associated with the first user;
    authenticating, at the first personal identification device, a second biometric input of the first user based on the biometric template of the first user stored at the first personal identification device;
    sending the subscription privilege associated with the first user from the first personal identification device to a second media device at a second location when the second biometric input is authentic such that the second media device ceases to inhibit output of the media transmitted from the media provider based on the subscription privilege associated with the first user, the second media device being different from the first media device, the second location being different from the first location, the media transmitted from the media provider to the first media device being concurrently transmitted from the media provider to the second media device;
    producing, at the first personal identification device, a subscription privilege associated with a second user different from the first user, the subscription privilege associated with the second user being configured to permit access to the media from the media provider associated with the subscription privilege associated with the first user; and
    sending from the first personal identification device to a second personal identification device the subscription privilege associated with the first user and the subscription privilege associated with the second user, the second personal identification device being associated with the second user.

2. The method of claim 1, wherein the subscription privilege associated with the first user is uniquely associated with a media channel.

3. The method of claim 1, wherein the subscription privilege associated with the first user is uniquely associated with a first media channel, the method further comprising:
    sending a second subscription privilege associated with the first user uniquely associated with a second media channel different from the first media channel.

4. The method of claim 1, wherein the first media device is located within a residence different from a residence within which the second media device is located.

5. The method of claim 1, wherein the first media device is associated with a subscription of the first user, the second media device is associated with a subscription of a third user, the subscription of the third user is different from the subscription of the first user.

6. The method of claim 1, wherein the first media device has been pre-registered with a subscription service of the media provider, the second media device has been pre-registered with the subscription service of the media provider.

7. The method of claim 1, wherein the subscription privilege associated with the first user excludes biometric information of the first user.

8. The method of claim 1, wherein the media provider is a television or radio broadcast media provider, the sending the subscription privilege associated with the first user to the first media device when the first biometric input is authentic is such that the first media device decrypts encrypted media transmitted from the television or radio broadcast media provider, the sending the subscription privilege to the second media device when the second biometric input is authentic is such that the second media device decrypts encrypted media transmitted from the television or radio broadcast media provider.

9. The method of claim 1, wherein the subscription privilege associated with the first user is a first subscription privilege associated with the first user, the first subscription privilege being associated with a first media channel having a frequency, the media transmitted from the media provider is associated with the first media channel, the method further comprising:
    sending a second subscription privilege associated with the first user from the first personal identification device of the first user to the first media device at the first location when a third biometric input is authentic such that the first media device ceases to inhibit output of media associated with a second media channel transmitted from the media provider based on the second subscription privilege associated with the first user, the second subscription privilege being associated with the second media channel having a frequency different than the frequency of the first media channel.

10. The method of claim 1, further comprising:
    verifying that the subscription privilege associated with the second user is a subset of the subscription privilege associated with the first user before the sending from the first personal identification device to the second personal identification device.

11. The method of claim 1, wherein the subscription privilege associated with the second user includes a restriction determined by the first user, the restriction being associated with media output based on the subscription privilege associated with the second user.

12. A method, comprising:
    authenticating, at a first personal identification device, a biometric input of a first user based on a biometric template of the first user stored at the first personal identification device;
    sending a subscription privilege associated with the first user from the first personal identification device of the first user to a media device when the biometric input is authentic such that the media device performs at least one of (1) ceasing to inhibit output of media output from a television or radio broadcast media provider based on the subscription privilege associated with the first user or (2) decrypting encrypted media output from the television or radio broadcast media provider based on the subscription privilege associated with the first user, the media being associated with a premium content channel of the television or radio broadcast media provider, the subscription privilege associated with the first user being associated with the premium content channel of the television or radio broadcast media provider, the subscription privilege associated with the first user being configured to permit full access to the media from the television or radio broadcast media provider associated with the subscription privilege associated with the first user;

producing at the first personal identification device a subscription privilege associated with a second user different from the first user, the subscription privilege associated with the second user being configured to permit limited access to the media from the television or radio broadcast media provider associated with the subscription privilege associated with the first user and sending from the first personal identification device to a second personal identification device the subscription privilege associated with the first user and the subscription privilege associated with the second user, the second personal identification device being associated with the second user.

13. The method of claim 12, wherein the sending the subscription privilege associated with the first user from the first personal identification device of the first user to the media device is performed such that the media device authenticates the subscription privilege associated with the first user.

14. The method of claim 12, wherein the biometric input is a first biometric input and the media device is a first media device at a first location, the method further comprising:

authenticating, at the first personal identification device, a second biometric input of the first user based on the biometric template of the first user stored at the first personal identification device; and sending the subscription privilege associated with the first user from the first personal identification device of the first user to a second media device at a second location when the second biometric input is authentic such that the second media device performs at least one of (1) ceasing to inhibit the media output from the television or radio broadcast media provider based on the subscription privilege associated with the first user or (2) decrypting the encrypted media output from the television or radio broadcast media provider based on the subscription privilege associated with the first user, the second location being different from the first location, the media from the television or radio broadcast media provider being concurrently transmitted to the first media device and the second media device.

15. The method of claim 12, wherein the subscription privilege associated with the first user excludes biometric information of the first user.

16. The method of claim 12, wherein the media device has been pre-registered with a subscription service of the media provider.

17. The method of claim 12, further comprising:
deleting the biometric template from the first personal identification device upon unauthorized attempted physical or logical access.

18. The method of claim 12, wherein the biometric input is a first biometric input, the subscription privilege associated with the first user being a first subscription privilege associated with the first user, the premium content media channel having a frequency, the method further comprising:

sending a second subscription privilege associated with the first user from the first personal identification device of the first user to the media device when a second biometric input is authentic such that the media device performs at least one of (1) ceasing to inhibit media output associated with a second premium content media channel from a television or radio broadcast media provider based on the second subscription privilege associated with the first user or (2) decrypting encrypted media output associated with the second premium content media channel based on the second subscription privilege associated with the first user, the second subscription privilege associated with the first user being associated with the second premium content media channel having a frequency different than the frequency of the first premium content media channel.

19. The method of claim 12, further comprising:
verifying that the subscription privilege associated with the second user is a subset of the subscription privilege associated with the first user before the sending from the first personal identification device to the second personal identification device.

20. The method of claim 12, wherein the subscription privilege associated with the second user includes a restriction determined by the first user, the restriction being associated with media output based on the subscription privilege associated with the second user.

21. A method, comprising:
receiving concurrently, at a media device, from a media provider media associated with a first media channel and media associated with a second media channel different from the first media channel;

outputting, at the media device, the media associated with the first media channel;

inhibiting, at the media device, output of the media associated with the second media channel;

receiving, at the media device, from a first personal identification device a biometrically-authenticated subscription privilege associated with a first user, the biometrically-authenticated subscription privilege excluding biometric data of the first user, the biometrically-authenticated subscription privilege being configured to permit media output associated with the second media channel;

outputting, at the media device, media associated with the second media channel after the receiving the biometrically-authenticated subscription privilege associated with the first user;

receiving, at the media device, from a second personal identification device the biometrically-authenticated subscription privilege associated with the first user and a biometrically-authenticated subscription privilege associated with a second user, the biometrically-authenticated subscription privilege associated with the second user excludes biometric data of the second user, the second personal identification device being associated with the second user;

verifying, at the media device, the biometrically-authenticated subscription privilege associated with the first user and the biometrically-authenticated subscription privilege associated with the second user; and outputting, at the media device, media associated with the second media channel based on the biometrically-authenticated subscription privilege associated with the second user when the biometrically-authenticated subscription privilege associated with the first user is verified and when the biometrically-authenticated subscription privilege associated with the second user is verified.

22. The method of claim 21, further comprising:
sending to the media provider, before the outputting the media associated with the second media channel, the subscription privilege associated with the first user such that the media provider authenticates the subscription privilege associated with the first user.

23. The method of claim 21, further comprising:
verifying, before the outputting the media associated with the second media channel, the subscription privilege associated with the first user at the media device.

24. The method of claim 21, wherein the biometrically-authenticated subscription privilege associated with the first user is associated with the second media channel, the method further comprising:
receiving from the first personal identification device a biometrically-authenticated subscription privilege associated with a third media channel different from the first media channel and different from the second media channel, the biometrically-authenticated subscription privilege associated with the third media channel is associated with the first user and excludes the biometric data of the first user; and
outputting media associated with the third media channel when the biometrically-authenticated security subscription associated with the third media channel is verified.

25. The method of claim 21, wherein the first media channel has a frequency, the second media channel has a frequency different than the frequency of the first media channel, the method further comprising:
decrypting the media associated with the second media channel after the receiving the subscription privilege associated with the first user and when the media is encrypted.

26. The method of claim 21, wherein the verifying includes:
verifying that the biometrically-authenticated subscription privilege associated with the second user is authentic based on a digital signature associated with the first user; and
verifying that the biometrically-authenticated subscription privilege associated with the first user is authentic based on a digital signature associated with a media provider.

27. The method of claim 21, wherein the biometrically-authenticated subscription privilege associated with the second user includes a restriction determined by the first user, the restriction being associated with the media associated with the second media channel,
the outputting, at the media device, the media associated with the second channel being based on the restriction.

* * * * *

UNITED STATES PATENT AND TRADEMARK OFFICE
CERTIFICATE OF CORRECTION

| | | |
|---|---|---|
| PATENT NO. | : 7,783,892 B2 | Page 1 of 1 |
| APPLICATION NO. | : 10/858336 | |
| DATED | : August 24, 2010 | |
| INVENTOR(S) | : David C. Russell | |

It is certified that error appears in the above-identified patent and that said Letters Patent is hereby corrected as shown below:

Column 7
Line 15, replace "satelite" with --satellite--

Column 12
Line 62, delete "output of"

Column 13
Line 11, replace "producing at the first personal identification device a" with --producing, at the first personal identification device, a--

Column 13
Line 17, replace "user and" with --user; and--

Signed and Sealed this

Second Day of November, 2010

David J. Kappos
*Director of the United States Patent and Trademark Office*